UNITED STATES PATENT OFFICE.

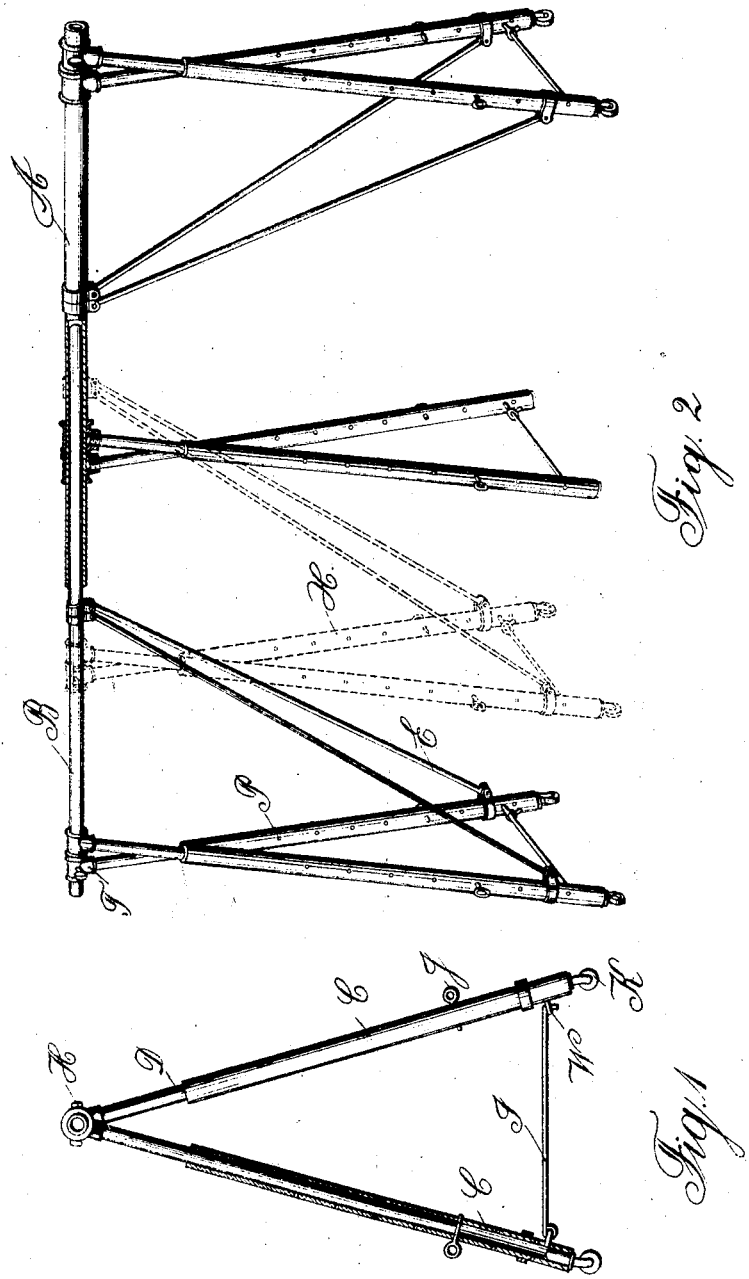

BENJAMIN H. HOWSER, OF MOUNT EDEN, KENTUCKY.

ADJUSTABLE SUPPORT.

No. 812,344.      Specification of Letters Patent.      Patented Feb. 13, 1906.

Application filed July 9, 1904. Serial No. 215,938.

*To all whom it may concern:*

Be it known that I, BENJAMIN H. HOWSER, a citizen of the United States, residing at Mount Eden, in the county of Shelby and State of Kentucky, have invented a new and useful Adjustable Support, of which the following is a specification.

My invention relates to improvements in that class of mechanical devices which are for the purpose of serving as adjustable supports generally; and it consists more particularly in the novel construction and combination of parts hereinafter shown, described, and claimed.

The great advantages of a practical portable breakdown support or scaffold are recognized by every carpenter, plasterer, paperhanger, or other tradesman who has to work at an elevation from the ground or floor, and such advantages are especially manifest when applied toward the supporting of tents and other temporary structures. Therefore the main desideratum of my invention is to fulfil all the requirements of such work.

One object of my invention is the construction of a support that permits of being dismantled and erected with ease and expedition and is capable of being readily reduced and packed in a small space and in a convenient form for shipment or transportation.

Another object of my invention lies in providing a supporting means with adjustable features, whereby the height, length, and breadth may be varied so as to permit of being used in various places and positions and otherwise employed in such manner and form as may be desired by the user.

As an additional object I contemplate a device which may be moved without undue effort from place to place at will while in the assembled operative condition.

A further object of this invention is to devise a support, as already stated, which will be of a maximum strength and a minimum weight and be of the most durable nature possible.

A still further object of my invention is to provide a supporting means which will be especially adaptable toward upholding a tent or other similar structure.

Further objects and the advantages of the various details of construction and combination of parts of my invention will appear upon reference to the following description and claims when taken in connection with the accompanying drawings, in which—

Figure 1 is an end elevation, partly in section, showing the relationship of the parts. Fig. 2 is a sectional perspective of my support with parts in section and parts in dotted lines to show a different position of the leg member.

Referring by letter to said drawings, it will be noted that similar letters denote similar parts throughout both drawings.

A, as shown in Fig. 2, is a piece of piping of any desired length, which may be made of steel or other suitable material, and B (same figure) is a rod of fixed length of suitable material so proportioned with relation to pipe A that it will slide freely within said pipe. In practice I find that by making A of one-inch steel piping and B of seven-eighths-inch steel rod that the structure is sufficiently light and rigid to answer for many purposes.

The legs of my support comprise two essential elements D and C, which, like the above-mentioned parts A B, slide freely one within the other. Corresponding with the above-given dimensions, C may be made of piping substantially three-fourths inch in diameter and D of rods five-eighths inch in diameter. In order that the support may be readily adjusted to any desired height, I cause perforations P to be made in pipes C, as shown in the figures, and fitting into said perforations is a key or pin J, the function of which will be readily understood upon inspection of the drawings. The legs are adjustably joined to the members (horizontal) A B by means of ordinary T's T, thus admirably fulfilling all the requirements and being of slight cost. The T's, however, are furnished with thumb set-screws H, so that the same may be firmly withheld from any slipping which might otherwise take place. In order to secure the necessary degree of rigidity to my structure, I employ braces E, which are united to members C and B, respectively, and to members A and C, respectively, by collars of suitable size and which may be made of any suitable size and material, though to correspond with the dimensions given above by way of example I would make them of one-half-inch steel piping. If so desired, such collars may be provided with thumb set-screws, as above described, thereby furnishing them with means for firmly clamping them in place. A further brace connecting the two legs is shown in the member I, (which, corresponding with the above dimensions, may be made of one-half-inch steel rod,) which may be affixed at one end to the adjoining member by an ordinary link and at the other end to the other member by means of the common detachable hook, as shown at W.

I provide my legs with ordinary casters, as shown in the figures at K. This I find to be a very substantial feature in practical working on account of the ease with which my supports may be moved about.

In case it is desired to have the support of great length it may be expedient to support the middle thereof, and for such purpose I model legs of a similar construction to C and D; but I dispense with the casters and the diagonal braces E.

In dotted lines X, I show my support in a shorter position.

Having thus described my invention, I claim and desire to secure by Letters Patent—

1. An adjustable support comprising in combination, a horizontal member consisting of a tubular member A, and a rod B longitudinally adjustable therewithin, legs comprising perforated tubular lengths and rod-like lengths slidably embraced therein, pins in said perforations limiting the relative movements of said perforated lengths with said rod-like lengths, clamping-T's provided one for each of said legs and permanently attached thereto and individually and revolubly uniting each of said legs to said horizontal member and adjustable along the latter, whereby the legs may be independently positioned along said horizontal member and angularly adjusted thereto, braces joining the lower ends of each pair of legs together and detachably affixed to one leg and pivotally affixed to the other, stiffening members diagonally connecting the lower end of each leg with the body of the horizontal member, casters upon the ends of said legs, and a middle extensible supporting member adjustably affixed to the aforesaid horizontal member, substantially as described.

2. In a paper-hanger's support, an imperforate, horizontal extensible member comprising a socketed means, and a rod slidably connected thereto within said socket, in combination with a plurality of independent extensible supporting means slidably and revolubly adjustable thereto, each comprising tube-like members having perforations extending therethrough and rod-like members capable of longitudinal movement within said tube, means for fixing said tube and rod relatively to one another, and braces connecting said horizontal member with the supporting member.

3. An adjustable support comprising in combination, a horizontal bridge member consisting of an imperforate tubular member, and a rod longitudinally adjustable therewithin, legs comprising perforated tubular lengths and imperforate rod-like lengths slidably embraced therein, pins in said perforations limiting the movement of said imperforate lengths into said perforated lengths, single clamping-T's uniting each of said legs to said horizontal member and revolubly and slidably adjustable along the latter, braces joining the lower ends of each pair of legs together, said braces being each detachably affixed to one leg and pivotally affixed to the other, stiffening members diagonally connecting by clamping-collars the lower end of each leg with the body of the horizontal member, casters upon the ends of said legs, and a middle extensible supporting member adjustably affixed to the aforesaid horizontal member, substantially as described.

4. A trestle comprising an extensible bridge-bar consisting of an imperforate tubular member and a rod telescopically engaged within same, extensible legs for supporting said bridge-bar, said legs consisting each of a single pipe-T, a thumb-screw engaging through a threaded perforation in the top part of each said T whereby same may be clamped at will at predetermined positions along said bridge-bar in diverse angular relationship thereto, imperforate rods affixed within the short leg of each said T, a perforate tubular leg member telescopically inclosing the free end of said rod, a pin adapted to be inserted through any one of said perforations whereby the insertion of said rod into said tubular member may be checked without preventing the complete withdrawal therefrom, casters mounted upon the lower ends of said tubular members, braces portably but detachably affixed to one such tubular member but having the other end hook-shaped for ready detachable engagement to another tubular member whereby the lower ends of each pair of legs may be positively positioned relative to one another, stiffening members extending diagonally from the lower end of each leg to points intermediate the ends of said bridge member, clamping-collars uniting the ends of said members to the adjacent trestle portions, and an extensible supporting-leg joined to an intermediate portion of said bridge-bar, substantially as described.

5. In a trestle, the combination of the legs comprising the lower sections, the vertically-adjustable upper legs comprising the upper sections and adapted to be embraced within the lower sections, suitable means for limiting the downward movement of said upper section, an elongated hook device for connecting said lower sections and preventing the latter from spreading, said device being detachably connected to one leg and permanently but pivotally affixed to the other, single T's uniting the upper end of each leg to the horizontal bar, said T's carrying each thumb-clamps for immovably affixing same, whereby each leg may be independently positioned in diverse angular and lateral relationship to said horizontal bar, a horizontal, extensible, compound bar, the same comprising a tubular member and a rod-like member telescopically arranged in said tubular member, diagonally-arranged braces pivotally connected at each end to collars embracing said legs and said horizontal bar respectively and a middle extensible support, substantially as described.

In testimony whereof I have signed my name, in the presence of two subscribing witnesses, to this specification.

BENJAMIN H. HOWSER.

Witnesses:
J. W. SWICLER,
F. H. HEDDEN.